US007744006B2

(12) United States Patent
Nara

(10) Patent No.: US 7,744,006 B2
(45) Date of Patent: *Jun. 29, 2010

(54) SEMICONDUCTOR DEVICE AND MEMORY CARD HAVING THE SAME

(75) Inventor: Nobuyoshi Nara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/115,418

(22) Filed: May 5, 2008

(65) Prior Publication Data

US 2009/0008461 A1  Jan. 8, 2009

Related U.S. Application Data

(63) Continuation of application No. 11/513,025, filed on Aug. 31, 2006, now Pat. No. 7,370,810, which is a continuation of application No. PCT/JP2005/017429, filed on Sep. 15, 2005.

(30) Foreign Application Priority Data

Oct. 4, 2004  (JP)  ............................. 2004-291661

(51) Int. Cl.
  *G06K 19/05* (2006.01)
(52) U.S. Cl. ...................................... 235/492; 235/380
(58) Field of Classification Search ................ 235/492, 235/380, 451; 711/101, 115; 710/301; 365/229, 365/233, 233.5, 208, 207; 714/763
See application file for complete search history.

(56) References Cited

U.S. PATENT DOCUMENTS

| 5,426,432 | A | 6/1995 | Sanemitsu et al. |
| 5,504,701 | A * | 4/1996 | Takahashi et al. ....... 365/185.04 |
| 6,543,690 | B2 | 4/2003 | Leydier et al. |
| 6,769,087 | B2 | 7/2004 | Moro et al. |
| 7,046,573 | B2 * | 5/2006 | Takazawa et al. ............ 365/229 |
| 7,370,810 | B2 * | 5/2008 | Nara ............................ 235/492 |
| 2002/0066791 | A1 | 6/2002 | Leydier et al. |
| 2004/0117553 | A1 | 6/2004 | Kurakata et al. |

FOREIGN PATENT DOCUMENTS

| JP | 07 064866 A | 3/1995 |
| JP | 9-62808 | 3/1997 |
| JP | 10-149238 | 6/1998 |
| JP | 10-173508 | 6/1998 |

* cited by examiner

*Primary Examiner*—Daniel St.Cyr
(74) *Attorney, Agent, or Firm*—Oblon, Spivak, McClelland, Maier & Neustadt, L.L.P.

(57) ABSTRACT

A semiconductor device includes a first circuit which operates in accordance with an internal clock, a second circuit which generates information of which an external apparatus is to be notified, an interface section which notifies the external apparatus of the information generated by the second circuit without using the first circuit upon receiving a predetermined command from the external apparatus, and a plurality of terminals each of which is connectable to one of power terminals and ground terminals provided on a substrate. The information is determined depending on whether each of the plurality of terminals is electrically connected to the power terminal or ground terminal on the substrate.

8 Claims, 11 Drawing Sheets

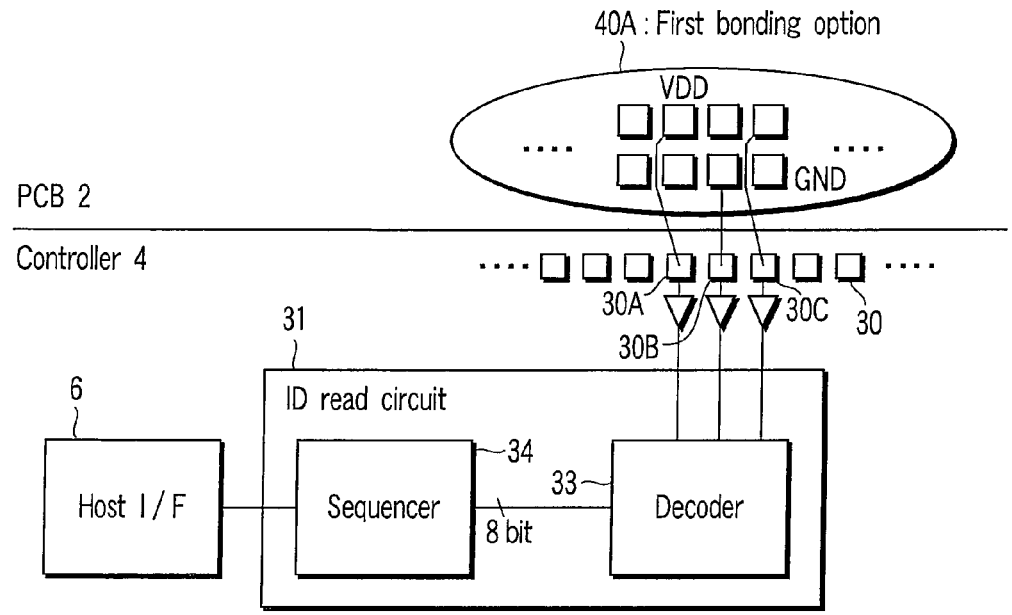
F I G. 11
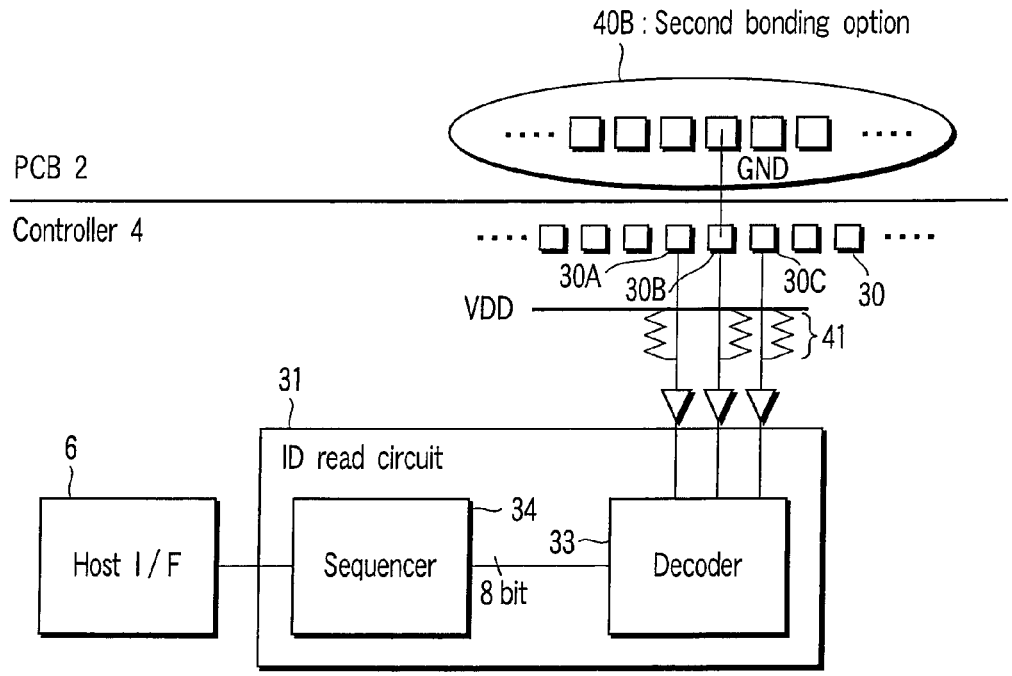
F I G. 12

| Memory capacity | D7 | D6 | D5 | D4 | D3 | D2 | D1 | D0 |
|---|---|---|---|---|---|---|---|---|
| 16MByte | 0 | 1 | 1 | 1 | 0 | 0 | 1 | 1 |
| 32MByte | 0 | 1 | 1 | 1 | 0 | 1 | 0 | 1 |
| 64MByte | 0 | 1 | 1 | 1 | 0 | 1 | 1 | 0 |
| 128MByte | 0 | 1 | 1 | 1 | 1 | 0 | 0 | 1 |
| 256MByte | 0 | 1 | 1 | 1 | 0 | 0 | 0 | 1 |
| 512MByte | 1 | 1 | 0 | 1 | 1 | 1 | 0 | 0 |
| 1GByte | 1 | 1 | 0 | 1 | 0 | 0 | 1 | 1 |
| 2GByte | 1 | 1 | 0 | 1 | 0 | 1 | 0 | 1 |

F I G. 13

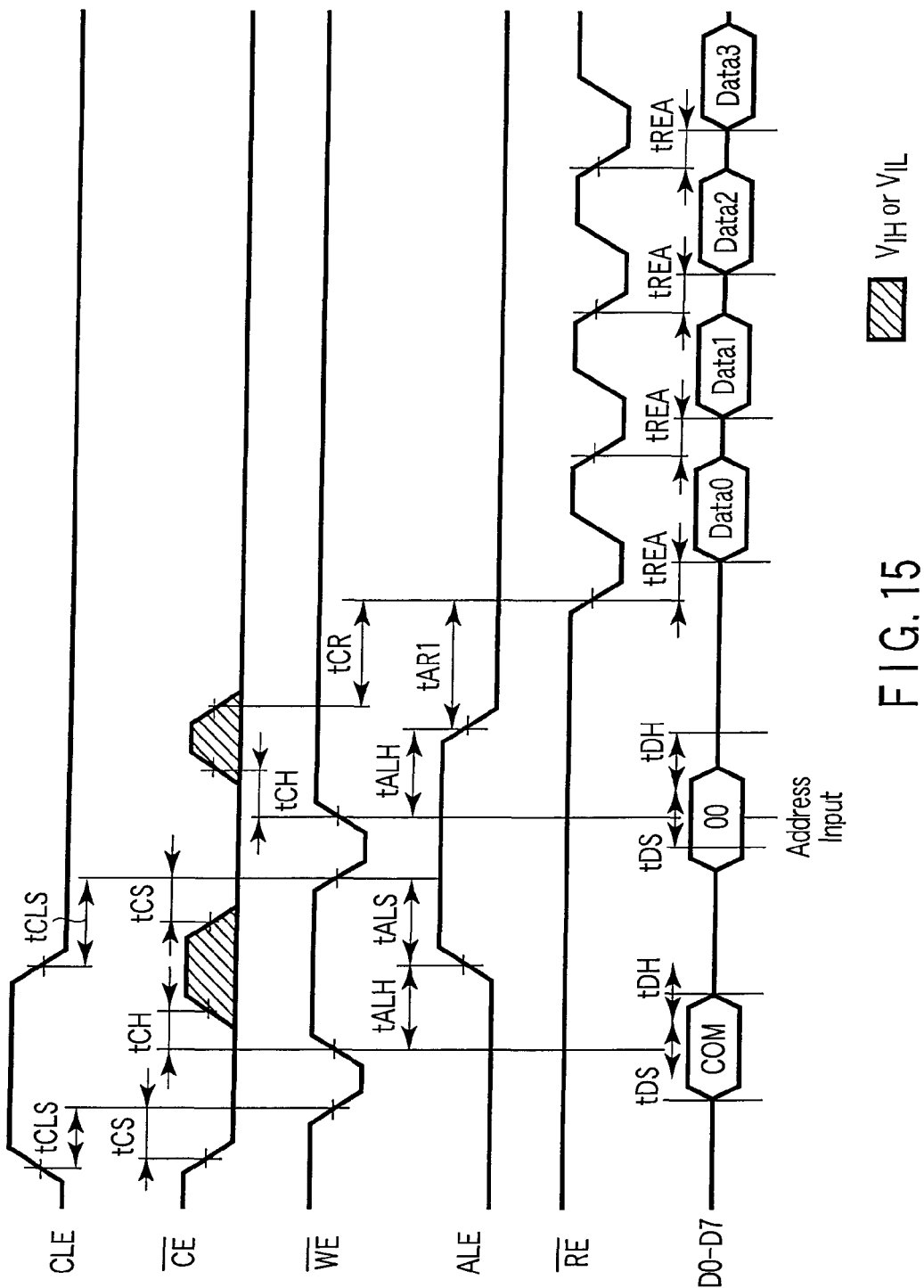
F I G. 15

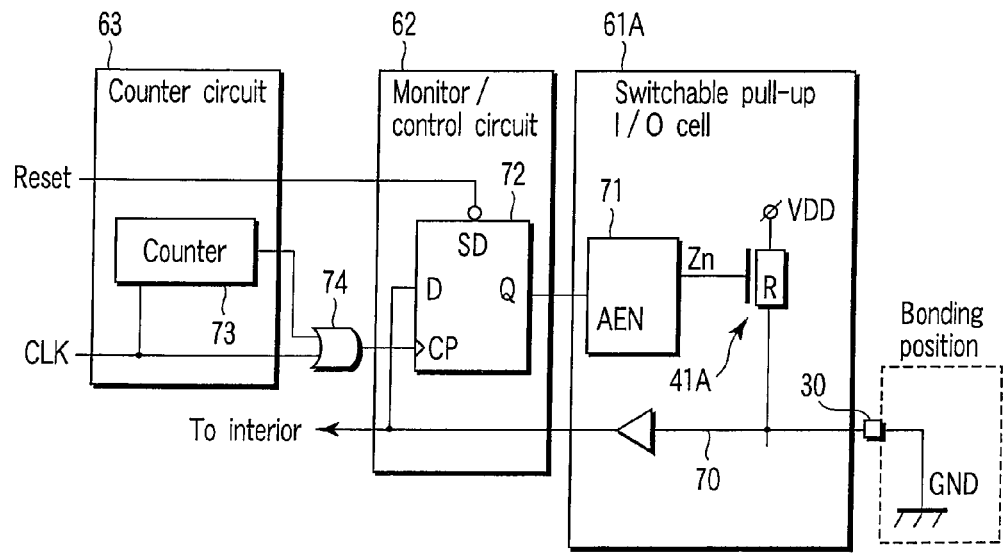
F I G. 16
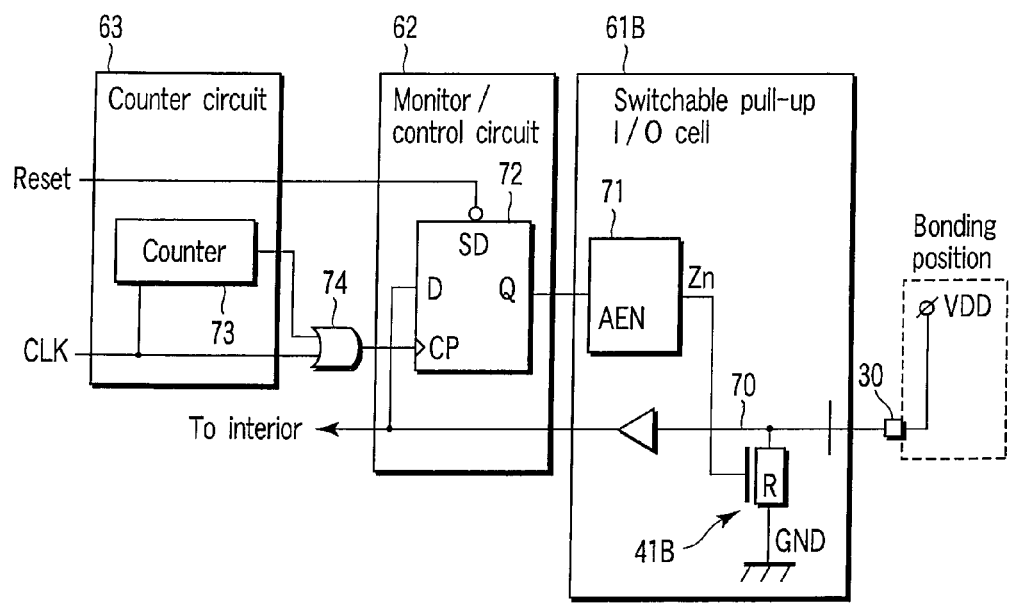
F I G. 17

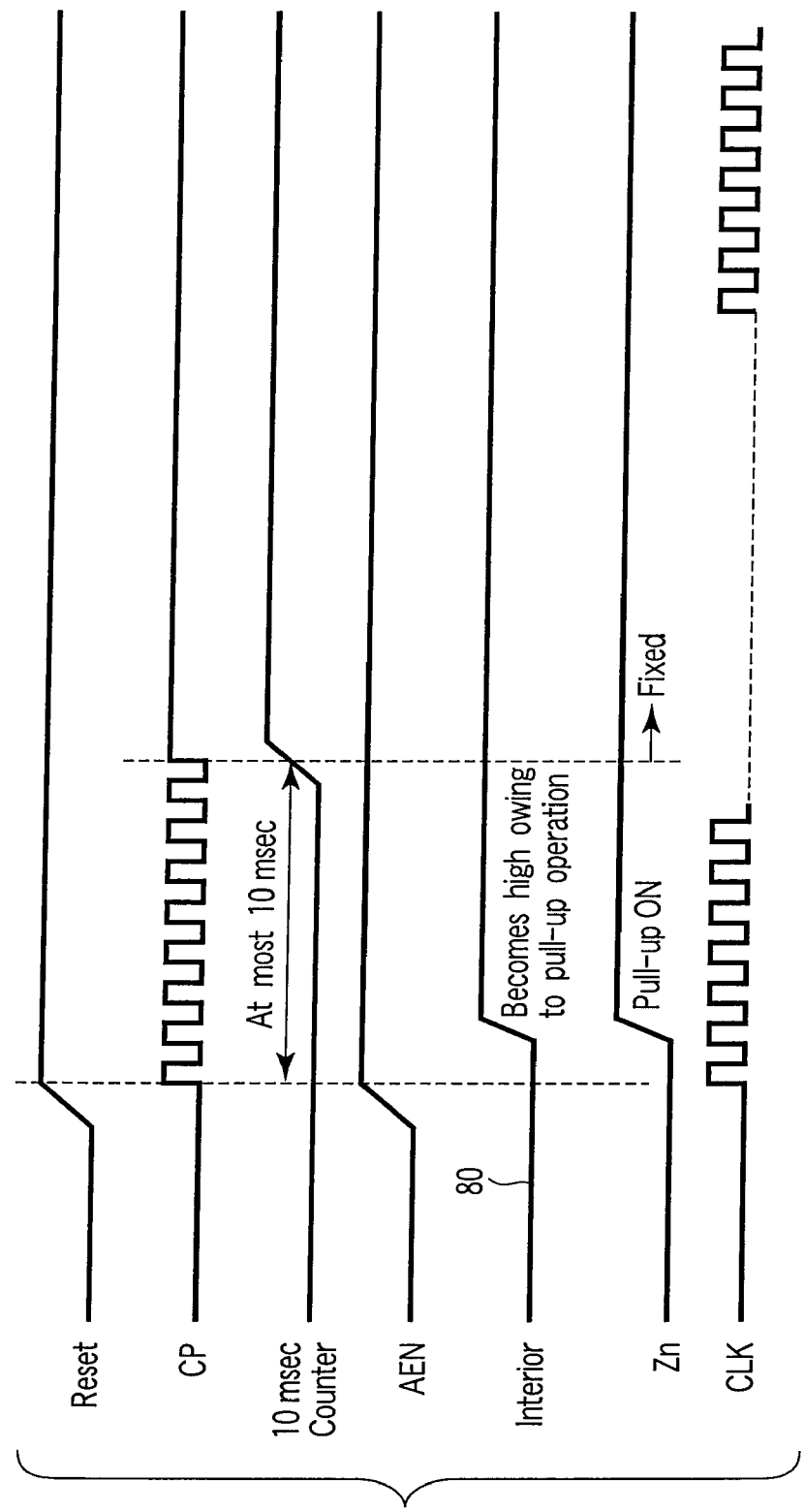

SEMICONDUCTOR DEVICE AND MEMORY CARD HAVING THE SAME

CROSS-REFERENCE TO RELATED APPLICATIONS

This application is a Continuation and claims the benefit of priority under 35 U.S.C. §120 from U.S. application Ser. No. 11/513,025, filed Aug. 31, 2006 which is a Continuation of PCT Application No. PCT/JP2005/017429, filed Sep. 15, 2005, and claims the benefit of priority under 35 U.S.C. §119 of Japanese Patent Application No. 2004-291661, filed on Oct. 4, 2004. The entire contents of these applications are incorporated herein by reference.

BACKGROUND OF THE INVENTION

1. Field of the Invention

The present invention relates to a semiconductor device having a controller capable of transmitting and receiving information to and from an external apparatus, and in particular, to a semiconductor device capable of responding to a command received from an external apparatus within a specified period after the device has been powered on, and a memory card having the semiconductor device.

2. Description of the Related Art

In recent years, various memory cards have been emerging. If a certain type of memory card receives a predetermined command immediately after being supplied with power, it must immediately notify a host apparatus of information indicating the capacity of a memory and the like. The notification of this information must be carried out within a period defined in the specifications of the memory card.

Commands sent by the host apparatus are processed through, for example, a CPU mounted in a controller that controls the memory. Immediately after a power supply, a setup process is executed which relates to the oscillation of a clock required to operate the CPU as well as the setting of a phase locked loop (PLL). The CPU can start normal operations after the setup process has been completed. Thus, a long time may be required by the memory card to enter a standby state (the state in which the memory can respond to an access command from the host apparatus). As a result, the memory card may fail to notify the host apparatus of information indicating the capacity of a memory and the like within the period defined in the specifications of the memory card.

Jpn. Pat. Appln. KOKAI Publication No. 9-062808 discloses a technique for improving an operation performed until a supplied voltage reaches a predetermined operation voltage; the operation tends to be unstable.

This document states that while the supplied voltage remains at a specified value or less, an internal circuit is reset and thus ensured to perform normal operations. However, according to this document, the memory card cannot process a command sent by the host apparatus and notify the host apparatus of the information indicating the capacity of the memory or the like which the command requires, before entering the standby state after power-on.

It is thus desired to present such a technique as enables the memory card to notify the external apparatus of the predetermined information before entering the standby state.

BRIEF SUMMARY OF THE INVENTION

A semiconductor device according to an embodiment of the present invention comprises a semiconductor device comprising a first circuit which operates in accordance with an internal clock; a second circuit which generates information of which an external apparatus is to be notified; an interface section which notifies the external apparatus of the information generated by the second circuit without using the first circuit upon receiving a predetermined command from the external apparatus; and a plurality of terminals each of which is connectable to one of power terminals and ground terminals provided on a substrate, the information being determined depending on whether each of the plurality of terminals is electrically connected to the power terminal or ground terminal on the substrate.

A semiconductor device according to an embodiment of the present invention comprises a semiconductor device comprising a first circuit which operates in accordance with an internal clock; a second circuit which generates information of which an external apparatus is to be notified; an interface section which notifies the external apparatus of the information generated by the second circuit without using the first circuit upon receiving a predetermined command from the external apparatus; and a plurality of second terminals each of which is connectable to one of a plurality of first terminals provided on a substrate, the information being determined depending on whether or not each of the plurality of second terminals is electrically connected to one of the first terminals on the substrate.

A memory card according to an embodiment of the present invention comprises a substrate having a power terminal and a ground terminal; a nonvolatile semiconductor memory provided on the substrate; and a controller provided on the substrate and having a plurality of terminals, the controller being capable of interfacing with an external apparatus and controlling the nonvolatile semiconductor memory, information of which the external apparatus is to be notified being determined depending on whether each of the plurality of terminals provided on the controller is electrically connected to the power terminal or ground terminal on the substrate.

A memory card according to an embodiment of the present invention comprises a substrate having a plurality of terminals; a nonvolatile semiconductor memory provided on the substrate; and a controller provided on the substrate and having a plurality of terminals, the controller being capable of interfacing with an external apparatus and controlling the nonvolatile semiconductor memory, information of which the external apparatus is to be notified being determined depending on whether or not each of the plurality of terminals provided on the controller is electrically connected to one of the plurality of terminals on the substrate.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a timing chart showing the relationship between signals to the R/B pins and a command issued by the host to the memory card according to the present embodiment immediately after power-on;

FIG. 11 is a diagram showing a first bonding option in which a combination of a plurality of power terminals and ground terminals are provided on a PCB;

FIG. 12 is a diagram showing a second bonding option in which a plurality of power terminals or ground terminals are provided on the PCB;

FIG. 13 is a table illustrating information indicating the storage capacity of a flash memory;

FIG. 15 is a timing chart showing an operation performed by the host interface in the controller upon receiving an ID read command;

FIG. 16 is a diagram showing an example of a circuit that suppresses the flow of a static current conducting from a power supply to a ground via a pull-up resistor in the configuration shown in FIG. 12;

FIG. 17 is a diagram showing a variation of the circuit shown in FIG. 16; and

FIG. 18 is a timing chart showing operations of the circuit shown in FIG. 16.

DETAILED DESCRIPTION OF THE INVENTION

Embodiments of the present invention will be described below with reference to the drawings.

Figure 1:
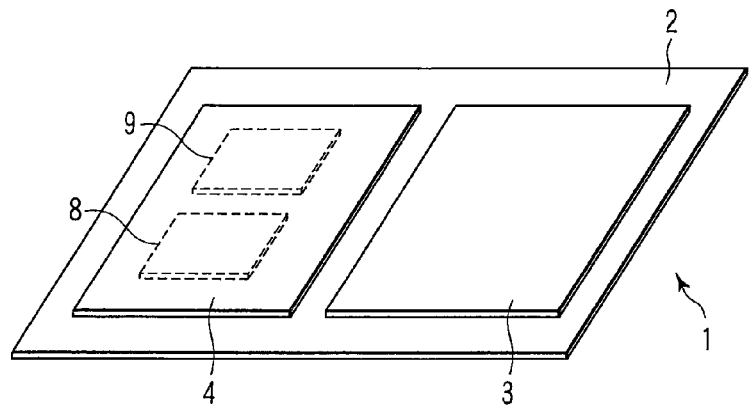
FIG. 1 is a perspective view schematically showing the configuration of a device or the like which is mounted in a memory card according to an embodiment of the present invention.

FIG. 1 is a perspective view schematically showing the configuration of a device or the like which is mounted in a memory card according to an embodiment of the present invention.

As shown in this figure, the memory card 1 according to the present embodiment has a NAND flash memory 3 and a controller 4 arranged on a printed circuit board (PCB) substrate 2. Functional blocks such as a central processing unit (CPU) 8 and a read-only memory (ROM) 9 are mounted in the controller 4. Each of the devices will be described later in detail. The NAND flash memory 3 may be a binary memory in which one-bit information is stored in one memory cell or a multi-valued memory in which information containing more than one bit (for example, 2 bits) is stored in one memory cell. FIG. 1 shows that the NAND flash memory 3 and the controller 4 are arranged on the PCB. However, the NAND flash memory 3 and the controller 4 may be arranged on the same large-scale integration (LSI) circuit board.

The terms "logical block address" and "physical block address", as used herein, mean the logical address and physical address, respectively, of a block itself. Further, the "logical address" and "physical address" principally mean the logical address and physical address of a block itself but indicates that they may be addresses corresponding to a resolution unit smaller than the block unit.

Figure 2:
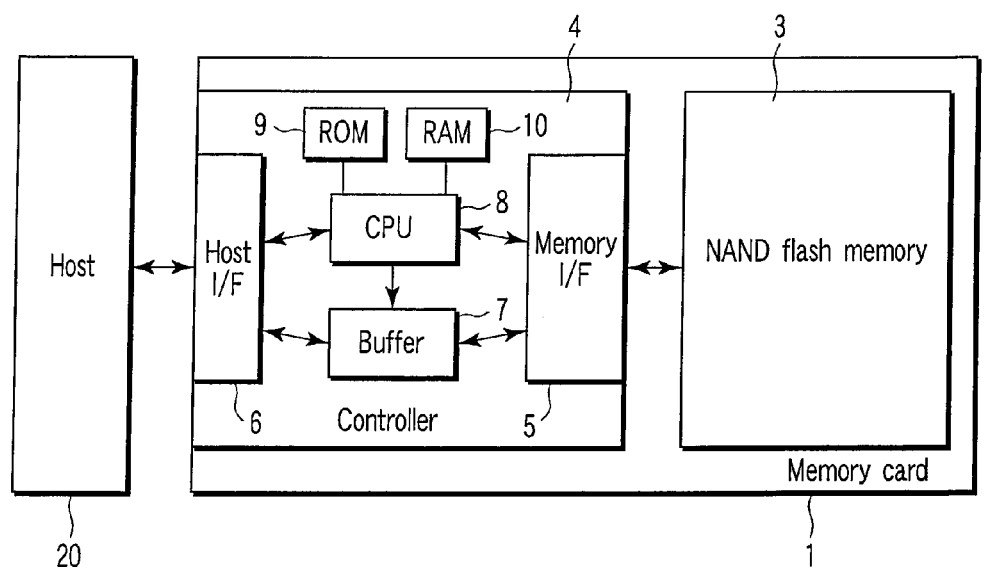
FIG. 2 is a block diagram showing a configuration including a host and the memory card.

FIG. 2 is a block diagram showing a configuration including a host and the memory card. Elements common to FIG. 1 are denoted by the same reference numerals.

A host apparatus (hereinafter referred to as a host) 20 comprises hardware and software (system) required to access a memory card to be connected to the host apparatus. The host 20 is constructed to manage the physical status of the interior of the memory card (which physical block address contains which logical sector address data, or from which block data has already been erased) to directly control the flash memory in the memory card.

Assuming that the NAND flash memory used has an erase block size of 16 Kbytes, the host 20 assigns every 16 Kbytes of logical and physical addresses, and in many cases, sequentially executes write or read accesses on 16 Kbytes of logical addresses (the corresponding commands are issued).

When connected to the host 20, the memory card 1 receives a power supply from the host 20 to operate. The memory card 1 then executes a process corresponding to an access from the host 2. The memory card 1 has the NAND flash memory 3 and the controller 4 as described previously.

The NAND flash memory 3 is a nonvolatile memory for which the erase block size (the block size corresponding to the erase unit) is set at 256 bytes. For example, for each write or read, 16 Kbytes of data is written in or read from the NAND flash memory 3. The NAND flash memory 3 is produced using, for example, a 0.09-μm process technique. That is, the design rule for the NAND flash memory 3 is less than 0.1 μm.

Besides the previously described CPU 8 and ROM 9, the controller 4 is provided with a memory interface section 5, a host interface section 6, a buffer 7, and a random access memory (RAM) 10.

The memory interface section 5 executes an interfacing process between the controller 4 and the NAND flash memory 3. The host interface section 6 executes an interfacing process between the controller 4 and the host 20.

When data sent by the host 20 is written in the NAND flash memory 3, the buffer 7 temporarily stores a specified amount of data (for example, one page of data). When data read from the NAND flash memory 3 is transmitted to the host 20, the buffer also temporarily stores a specified amount of data.

The CPU 8 controls operations of the whole memory card 1. When, for example, the memory card 1 receives a power supply, the CPU 8 loads firmware (a control program) stored in the ROM 9 onto the RAM 10 to execute a predetermined process. The CPU 8 thus creates various tables on the RAM 10, accesses a relevant area on the NAND flash memory 3 in response to a write, read, or erase command from the host 20, or controls a data transfer process through the buffer 7.

The ROM 9 is a memory that stores, for example, control programs used by the CPU 8. The RAM 10 is a memory used as a work area for the CPU 8 to store control programs and various tables.

Figure 3:
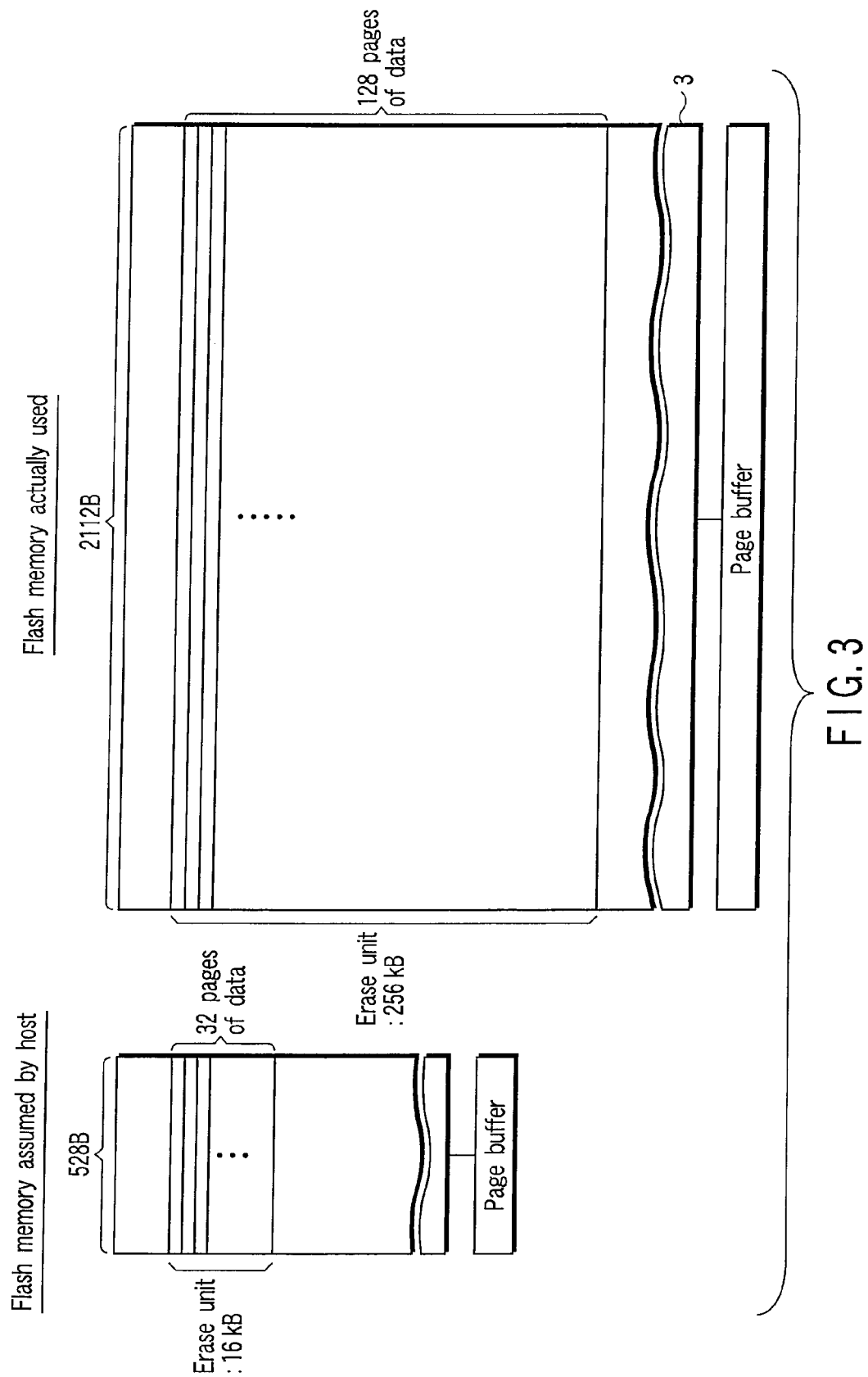
FIG. 3 is a diagram showing a difference in data arrangement between a flash memory assumed by a host system and a flash memory actually used.

FIG. 3 is a diagram showing a difference in data arrangement between a flash memory assumed by the host 20 and the flash memory actually used (that is, the NAND flash memory 3 in the memory card 1).

In the flash memory assumed by the host 20, each page has 528 bytes (512 bytes of data storage section+16 bytes of redundant section), and 32 pages correspond to one erase unit (that is, 16 Kbytes+0.5 Kbytes (in this case, K is 1,024)). A card in which such a flash memory is mounted will hereinafter sometimes be referred to as a "small block card".

On the other hand, in the flash memory 3 actually used, each page has 2,112 bytes (512 bytes of data storage section×4+10 bytes of redundant section×4+24 bytes of management data storage section), and 128 pages correspond to one erase unit (that is, 256 Kbytes+8 Kbytes. A card in which such a flash memory is mounted may hereinafter be referred to as a "large block card". For convenience, the erase unit for the small block card will hereinafter be referred to as 16 Kbytes. The erase unit for the large block card will hereinafter be referred to as 256K bytes.

Each of the flash memory assumed by the host 20 and the flash memory 3 actually used comprises a page buffer required to receive or output data from or to the flash memory. The page buffer provided in the flash memory assumed by the host 20 has a storage capacity of 528 bytes (512 bytes and 16 bytes). On the other hand, the page buffer provided in the flash memory actually used has a storage capacity of 2,112 bytes (2,048 bytes and 64 bytes). For each data write or the like, each page buffer receives or outputs one page of data from or to the flash memory, the page corresponding to its storage capacity.

In the example shown in FIG. 3, the flash memory 3 actually used has an erase block size 16 times as large as that of the flash memory assumed by the host 20. However, the present invention is not limited to this aspect. Another configuration is possible provided that the erase block size of the flash memory 3 actually used is substantially an integral multiple of that of the flash memory assumed by the host 20.

To make the large block card a product that is effective in a practical sense, the flash memory 3, shown in FIG. 3, desirably has a storage capacity of 1 Gbits or more. If the flash memory 3 has a storage memory of, for example, 1 Gbits, there are 512 256-Kbyte blocks (erase unit).

FIG. 3 illustrates that the erase unit is a 256-Kbyte block. However, it is also effective in a practical sense to configure the flash memory so that the erase unit is, for example, 128 Kbytes. In this case, there are 1,024 128-Kbyte blocks.

FIG. 3 also shows that the erase block size of the flash memory 3 actually used is larger than that of the flash memory assumed by the host 20. However, the present invention is not limited to this aspect, the flash memory may be configured so that the flash memory 3 actually used has a smaller erase block size than the flash memory assumed by the host 20.

Figure 4:
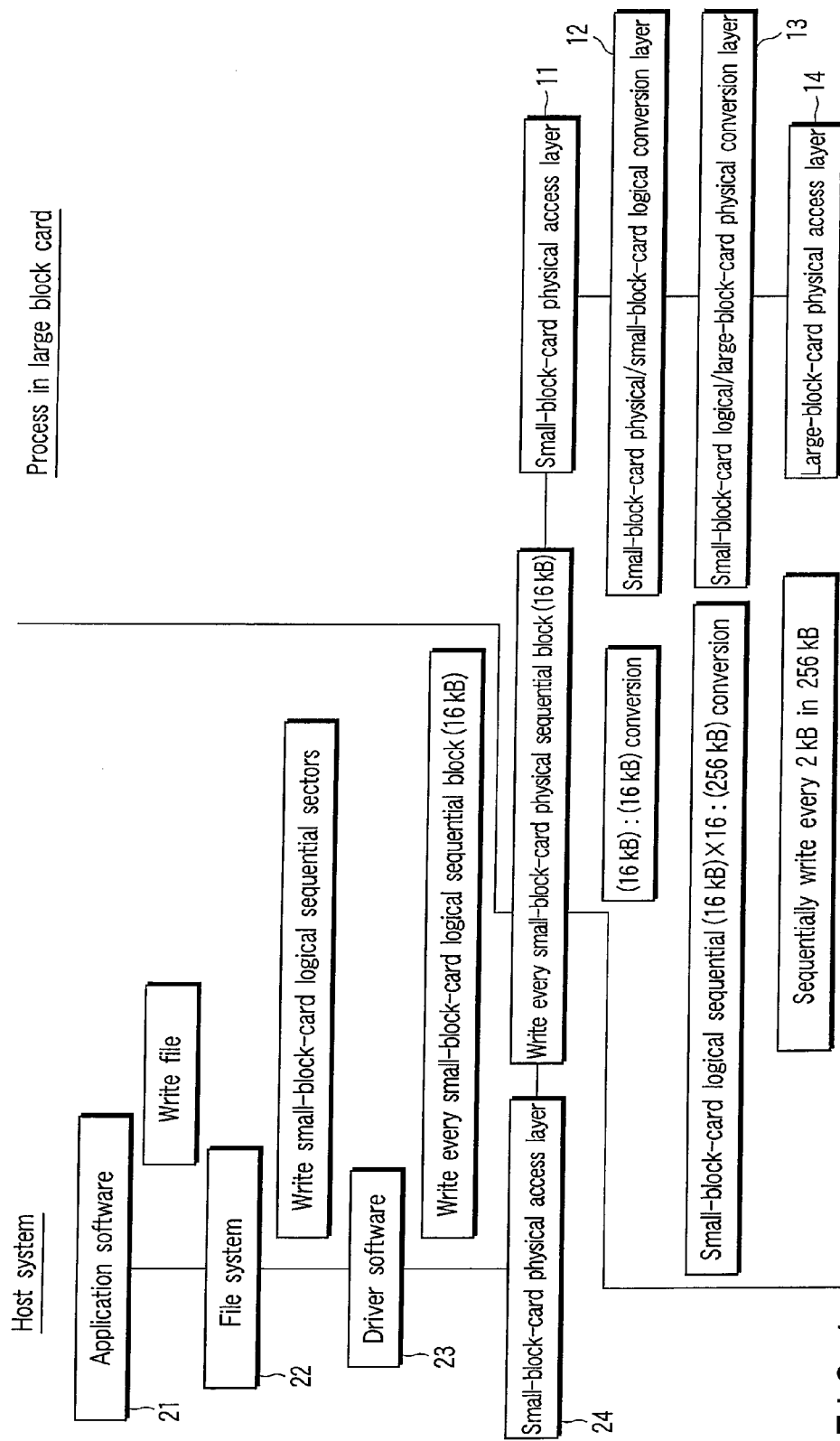
FIG. 4 is a chart showing the communication hierarchy of the host system and of the memory card (large block card)

FIG. 4 is a chart showing the communication hierarchy of the host system and of the memory card (large block card).

The host 20 system has application software 21, a file system 22, driver software 23, and a small-block-card physical access layer 24. On the other hand, the memory card 1 (large block card) has a small-block-card physical access layer 11, a small-block-card physical/small-block-card logical conversion layer 12, a small-block-card logical/large-block-card physical conversion layer 13, and a large-card-block physical access layer 14.

For example, the application software 21 in the host 20 requests the file system 22 to write a file in the memory. Then, the file system 22 instructs the driver software 23 on sequential sector writes on the basis of logical block addresses in the small block card. Upon receiving the instruction, the driver software 23 carries out logical/physical block conversions in order to sequentially write data, that is, one 16-Kbyte block at a time, on the basis of logical block addresses of the small block card. The driver software 23 then issues a random write command based on physical block addresses of the small block card, to the large block card through the small-block-card physical access layer 24. The driver software 23 then executes a data transfer.

For both small and large block cards, a write access is premised on the transmission of a (1) command, a (2) page address (row address), a (3) column address, (4) data, and a (5) program confirmation command in this order in accordance with an appropriate protocol.

Upon receiving a write command with logical block addresses of the small block card from the host 20, the small-block-card physical access layer 11 in the large block card acquires not only the physical block addresses and data but also logical block addresses contained in accompanying data.

The small-block-card physical/small-block-card logical conversion layer 12 has a first table used for a data read or the like to convert physical block addresses (each corresponding to 16-Kbyte block) of the small block card into logical block addresses (each corresponding to 16-Kbyte block) of the small block card. When the small-block-card physical access layer 11 receives a write command to acquire logical block addresses of the small block card, the conversion layer 12 reflects the logical block addresses in the first table. The conversion layer 12 also reflects physical block addresses in the first table.

The small-block-card logical/large-block-card physical conversion layer 13 has a second table used for a data read or the like to convert logical block addresses (each corresponding to sequential 16-Kbyte block×16) of the small block card into physical block addresses (each corresponding to 256-Kbyte physical block) of the large block card. When the small-block-card physical access layer 11 receives a write command to acquire logical block addresses of the small block card, the conversion layer 12 reflects the logical block addresses in the second table.

On the basis of the logical block addresses acquired by the small-block-card physical access layer 11 upon receiving the write command, the large-block-card physical access layer 14 determines how the data is arranged inside the flash memory 3. The large-block-card physical access layer 14 then sequentially writes 16 Kbytes of data in a 256-Kbyte physical block the memory by writing 2 Kbytes (one page) of data during each operation. The large-block-card physical access layer 14 stores the logical and physical block addresses of the small block card which have been acquired, in a predetermined area within a managed data area inside the flash memory 3.

The host 20 thus issues a command based on physical block addresses of the small block card. Accordingly, the large block card carries out management so as to make it possible to determine which 256-Kbyte physical block contains data corresponding to certain physical block addresses of the small block card. Specifically, the large block card manages the correspondences between logical block addresses and physical block addresses for every 16-Kbyte block. The large block card also carries out management so as to make it possible to determine which 256-Kbyte physical block in the large block card contains data corresponding to a 256-Kbyte block of consecutive logical block addresses of the small block card.

Figure 5A:
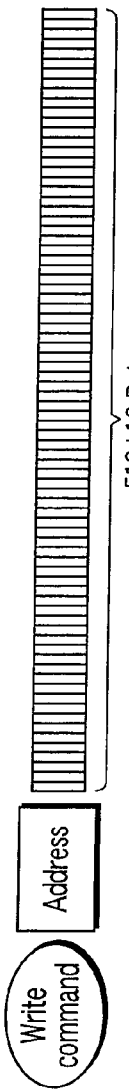
FIGS. 5A and 5B are diagrams showing the format of a command sent by the host.
Figure 5B:
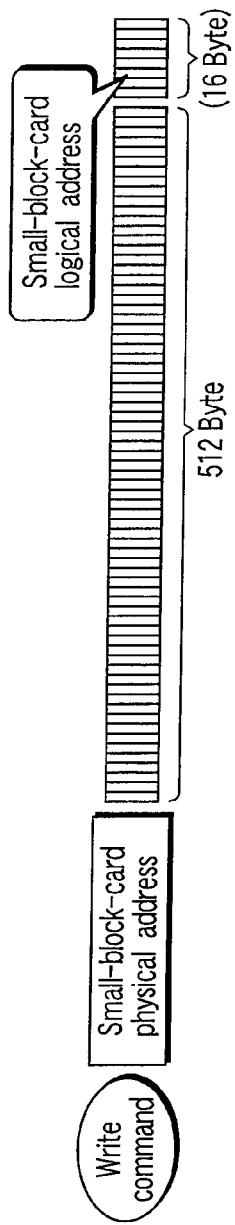

FIGS. 5A and 5B are diagrams showing the format of a command sent by the host 20.

A packet for a command sent by the host 20 contains various pieces of information such as command type information (in this case, "write"), addresses (physical block addresses), and data (actual data such as contents and accompanying data (512 bytes+16 bytes)) as shown in FIG. 5A.

In a packet in this format, "logical block addresses" (logical addresses corresponding to a 16-byte block to be accessed) of the small block card are arranged at a predetermined location in the accompanying data as shown in FIG. 5B. The large block card acquires not only the command type information, physical block addresses, and data but also the "logical block addresses". The "logical block addresses" are not added for a read command.

Figure 6:
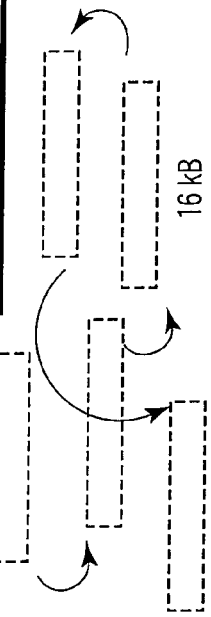
FIG. 6 is a diagram showing a comparison of a block write operation assumed by the host with a write operation actually performed by the memory card (large block card)
Figure 6:
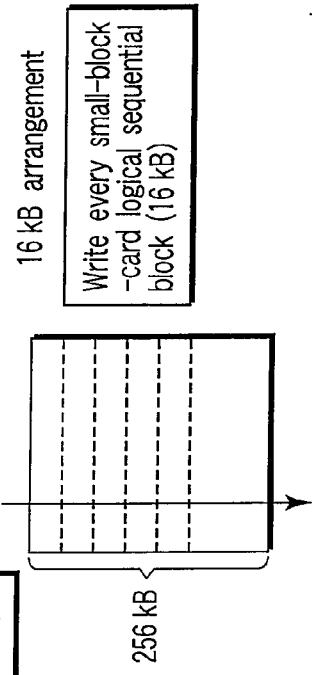

FIG. 6 is a diagram showing a comparison of a block write operation assumed by the host with a write operation actually performed by the memory card 1 (large block card).

When a sequential write operation in 16-Kbyte blocks is performed on the basis of logical addresses of the small block card, the host 20 (the left of the figure) performs a random write operation in 16-Kbyte blocks on the basis of physical block addresses of the small block card.

On the other hand, upon receiving a write command from the host 20, the large block card (the right of the figure) sequentially writes every 16 Kbytes of data in the flash memory 3 on the basis of logical block addresses of the small block card.

As previously described, the host 20 performs a random write operation in 16 Kbytes on the basis of physical addresses for small blocks. Such a random write operation involves many processes of rewriting only a part of a large block (256 Kbytes). The NAND flash memory only allows data to be erased in block units. Accordingly, if a block is partly rewritten, it is necessary to write new data to replace the corresponding part of old data, in a new block from which data has already been erased and then copy the remaining data which is not to be rewritten, from the old block containing the old data to be replaced with the new data, to the new block. In this manner, the process of rewriting only a part of a block involves an operation of copying data that is not to be rewritten (this operation will hereinafter be referred to as a "mixed-up data copy"). Consequently, many processes of rewriting only a part of a block may result in a significant increase in overhead. Thus, in the present embodiment, the large block card reassigns the physical addresses in accordance with the order of the logical addresses obtained from the host 20. This reduces the occurrence of writes to only a part of a block to suppress an increase in overhead.

Figure 7:
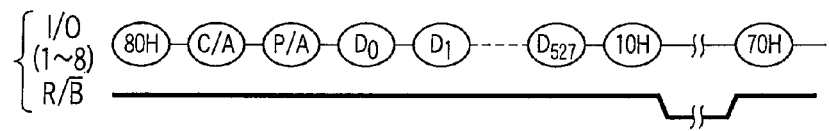
FIG. 7 is a timing chart showing an example of signals to an I/O and R/B pins of the memory card which signals are used when the host executes writes on the memory card according to the present embodiment.

FIG. 7 is a timing chart showing an example of signals to I/O and R/B pins of the memory card which signals are used when the host 20 executes writes on the memory card 1 according to the present embodiment.

The host 20 controls a memory card assuming that the memory card is a nonvolatile memory having a 16-Kbyte erase block size. For example, for a write in the memory card, the host 20 inputs a serial data input command 80H (H denotes a hexadecimal number) to I/O pins 1 to 8. Then, the host 20 inputs a column address C/A and a page address P/A to the I/O pins 1 to 8. The column address C/A and the page address P/A are provided for a virtual physical address space assumed by the host 20 for the memory card 1.

Moreover, the host 20 inputs write data to each of the I/O pins 1 to 8 528 times. Specifically, the host 20 sequentially shifts 528 bits (a total value for all the I/O pins) of data in each of the I/O pins while clocking an input signal to the write enable pin 528 times. Once the data shift-in has been completed, the host 20 inputs a program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready.

However, the status of the R/B pin in FIG. 7 only indicates the status of the memory card 1 to the host 20. That is, in FIG. 7, even when the R/B pin indicates a busy status (that is, outputs a low level) in response to the input of the program command 10H, this does not always indicate that an internal write operation (that is, transfer of data from the page buffer to a memory cell array) is actually being performed on the NAND flash memory 3. Even if the R/B pin returns to the ready status, this does not always indicate that an internal write operation on the NAND flash memory 3 has actually been completed.

Figure 8:
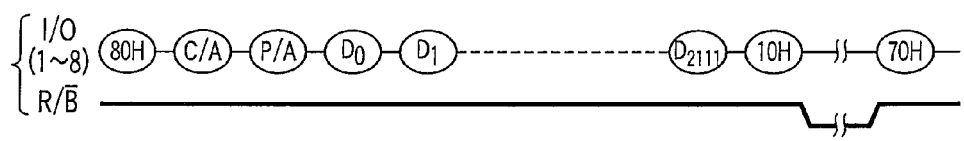
FIG. 8 is a timing chart showing an example of signals for the I/O and R/B pins of a nonvolatile memory in the memory card which signals are used when a controller in the memory card executes writes on the nonvolatile memory in the memory card according to the present embodiment.

FIG. 8 is a timing chart showing an example of signals to the I/O and R/B pins of the NAND flash memory 3 which signals are used when the controller 4 in the memory card 1 executes writes on the NAND flash memory 3 in the memory card 1 according to the present embodiment.

The controller 4 recognizes that the NAND flash memory 3 is nonvolatile and has a 256-Kbyte erase block size. For example, for a write in the NAND flash memory 3, the controller 4 inputs the serial data input command 80H (H denotes a hexadecimal number) to I/O pins 1 to 8. Then, the controller 4 inputs the column address C/A and the page address P/A to the I/O pins 1 to 8. The column address C/A and the page address P/A are provided for a real physical address space assumed by the controller 4 for the NAND flash memory 3. Accordingly, these addresses do not necessarily match the column address C/A and page address P/A in FIG. 7.

Moreover, the controller 4 inputs write data to each of the I/O pins 1 to 8 2,112 times. Specifically, the controller 4 sequentially shifts 2,112 bits (a total value for all the I/O pins) of data in each of the I/O pins while clocking an input signal to the write enable pin 2,112 times. Once the data shift-in has been completed, the controller 4 inputs the program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready. The status of the R/B pin in FIG. 8 indicates the actual status of the NAND flash memory 3 to the controller 4.

In FIGS. 7 and 8, previously described, each of the inputs of the column address C/A and page address P/A is shown completed in one cycle. However, the input may require two or more cycles depending on the capacity of the memory card 1 or NAND flash memory 3.

As can be seen in FIGS. 7 and 8, previously described, the time for which the memory card may be busy is restricted. That is, during this time, the controller must write the data and the predetermined time later, it must indicate to the host that the memory card has gotten ready.

Figure 9:
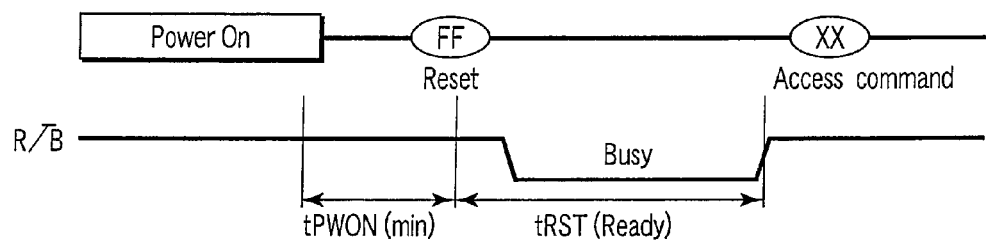

FIG. 9 is a timing chart showing the relationship between signals to the R/B pins and a command issued by the host to the memory card 1 immediately after power-on.

For example, when the memory card 1 is inserted into a slot in the host 20, the host 20 powers on the memory card 1 (supplies power to the memory card 1). The memory card 1 assumes that when or after a period "tPWON(min)" (for example, at least 2 ms) has elapsed since the power-on (specifically, since a voltage level (for example, 3.0 V) was reached at which the power supply is stable), the host 20 sends a reset command "FF" for initialization (or an ID read command "90H, 91H, or 9AH" requesting a read of identification information on the memory card) to the memory card 1. A clock required for the CPU 8 has not been formed yet. Accordingly, the CPU 8 cannot receive the reset command or ID read command.

The memory card 1 according to the present embodiment is adapted to notify, upon receiving the reset command or ID read command, the host 20 of the predetermined information (for example, the information indicating the storage capacity of the flash memory) without relying on the CPU 8 or the like, in response to a request in the command. This operation will be described later in detail.

After receiving the command, the memory card 1 does not receive any access command (a command requesting that data be written in or read from the flash memory 3) from the host 20 until an initializing process and the like are completed, that is, before a period "tRST(Ready)" elapses. During this period, the controller 4 outputs a low-level signal to the R/B pins to indicate that the memory card 1 is busy. The controller 4 then executes a setup process relating to the oscillation of the clock required to operate the CPU 8 as well as the setting of the PLL.

After the period "tRST(Ready)" has elapsed, the memory card 1 enters a standby state in which it can receive an access command from the host 20. On this occasion, the controller 4 outputs a high-level signal to the R/B pins to indicate that the memory card 1 is ready. The controller 4 then executes a process corresponding to the access command sent by the host 20.

Figure 10:
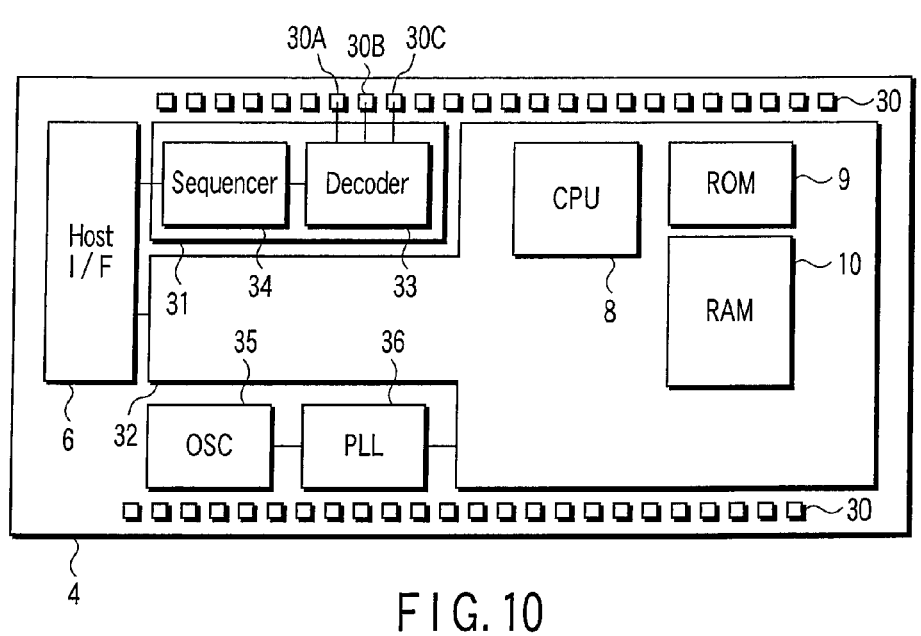
FIG. 10 is a diagram showing an example of the configuration of the controller.

FIG. 10 is a diagram showing an example of the configuration of the controller 4. Elements common to FIGS. 1 and 2 are denoted by the same reference numerals.

The controller 4 is provided with a group of terminals 30 (power terminals, a ground terminal, and the like) that can be connected, via wiring, to the group of terminals (or pads) on the PCB 2 using bonding (or bumps). The controller 4 is also provided not only with the host interface section 6, previously described, but also with an ID read circuit (first circuit) 31, a main circuit (second circuit) 32, an oscillation circuit (OSC) 35, a PLL circuit 36, and the like.

The ID read circuit 31 is used to process a command (for example, the ID read command) issued by the host 20 before the memory card 1 enters the standby state. On the other hand, the main circuit 32 is used to process a command (for example, the access command) issued by the host 20 after the memory card 1 has entered the standby state. The main circuit 32 includes the CPU 8, ROM 9, and RAM 10, previously described.

The ID read circuit 31 includes a decoder 33 and a sequencer 34. Further, several of the group of terminals 30 which are present relatively close to the decoder 33 (for example, three terminals 30A, 30B, and 30C) are electrically connected to the decoder 33 through wiring or the like. In particular, information on, for example, the storage capacity of the flash memory 3 (one of eight types of storage capacities) is determined on the basis of the electric connective relationship (one of eight connection forms) between three terminals 30A, 30B, and 30C and the three terminals on the PCB 2 (see FIG. 1). This connective relationship is established, for example, during a bonding process (or bump process) executed in an assembly step before shipment.

On the basis of a combination of the high and low levels of signals to the three terminals 30A, 30B, and 30C, the decoder 33 generates and sends 8-bit data (described later) to the sequencer 34. The sequencer 34 sequentially sends the host interface 6 the information obtained from the decoder 33 and other required information (information other than the storage capacity of the flash memory 3 which should be communicated to the host 20).

The oscillator (OSC) 35 generates an internal clock (reference frequency) for the controller 4. On the basis of the reference frequency, obtained from the oscillator 35, the PLL circuit 36 generates a signal of an increased frequency which is used by the CPU 8.

The host interface 6 determines the type of a command sent by the host 20. On the basis of the result of the determination, the host interface 6 determines whether to process the command using the ID read circuit 31 or the main circuit 32. For example, upon receiving the ID read command before the memory card 1 enters the standby state, the host interface 6 notifies the host 20 of the information obtained from the ID read circuit 31, without using the main circuit 32. On the other hand, upon receiving the access command after the memory card 1 has entered the standby state, the host interface 6 causes the main circuit 32 to process the command. The host interface 6 then notifies the host 20 of the results of the process.

Now, description will be given of two specific examples of the connective relationship between the three terminals 30A, 30B, and 30C and the three terminals on the PCB 2.

FIG. 11 is a diagram showing a first bonding option in which a combination of a plurality of power terminals and ground terminals are provided on the PCB 2. FIG. 12 is a diagram showing a second bonding option in which a plurality of ground terminals (or power terminals) are provided on the PCB 2.

According to a first bonding option 40A shown in FIG. 11, a combination of a plurality of power terminals and ground terminals are provided on the PCB 2. During wiring connection using bonding, the terminals 30A, 30B, and 30C are selectively connected to the power or ground terminals of the PCB 2. For example, to express a numerical value "1", wiring connection to the power terminal is used. To express a numerical value "0", wiring connection to the ground terminal is used. (Of course, the opposite form may be employed.) In the illustrated example, the terminals 30A and 30C are connected to the power terminals. The terminal 30B is connected to the ground terminal.

According to the first bonding option 40A, during wiring connection, eight kinds of information can be expressed by simple choices from the power terminals/ground terminals provided on the PCB 2.

On the other hand, according to a second bonding option 40B shown in FIG. 12, a plurality of ground terminals (or power terminals) are provided on the PCB 2. Further, in the controller 4, pull-up resistors (or pull-down resistors) 41 are each provided between each of the terminals 30A, 30B, and 30C and the power supply (or ground). During wiring connection using bonding, the terminals 30A, 30B, and 30C are selectively connected to the ground terminals (or power terminals) of the PCB 2 or are left unconnected (open). For example, to express the numerical value "1", the open state is used. To express the numerical value "0", wiring connection to the ground terminal is used. (Of course, the opposite form may be employed.) In the illustrated example, the terminals 30A and 30C are open. The terminal 30B is connected to the ground terminal.

The second bonding option 40B serves to reduce the number of terminals provided on the PCB 2 compared to the first bonding option 40A. This in turn reduces the area occupied by the terminals. It is also possible to reduce a decrease in the yield of the bonding process. However, with the configuration shown in FIG. 12, bonding to the ground terminal as seen for the terminal 30B causes a static current to flow from the power supply to the ground via the pull-up resistor 41. This may adversely affect, for example, the level of signals sent from the terminal to the decoder 33. Thus, a control mechanism is desirably provided which suppresses the flow of the current to stabilize the signal level. The control mechanism will be described later.

FIG. 13 is a table illustrating information indicating the storage capacity of a flash memory.

The following eight kinds of storage capacities are assumed for the flash memory: "16 Mbytes", "32 Mbytes", "64 Mbytes", "128 Mbytes", "256 Mbytes", "512 Mbytes", "1 Gbyte", and "2 Gbyte". Each of the capacities is defined using, for example, 8 bit data (D7 to D0). The ID read circuit 31 passes the 8 bit data to the host interface 6. The data is then transmitted to the host 20 via the I/O pins 1 to 8.

In the illustrated example, the storage capacity "16 Mbytes" is expressed as "01110011", and the storage capacity "32 Mbytes" is expressed as "01110101". The storage capacity "64 Mbytes" is expressed as "01110110", and the storage capacity "128 Mbytes" is expressed as "01111001". The storage capacity "256 Mbytes" is expressed as "01110001", and the storage capacity "512 Mbytes" is expressed as "11011100". The storage capacity "1 Gbyte" is expressed as "11010011", and the storage capacity "2 Gbytes" is expressed as "11010101".

Figure 14:
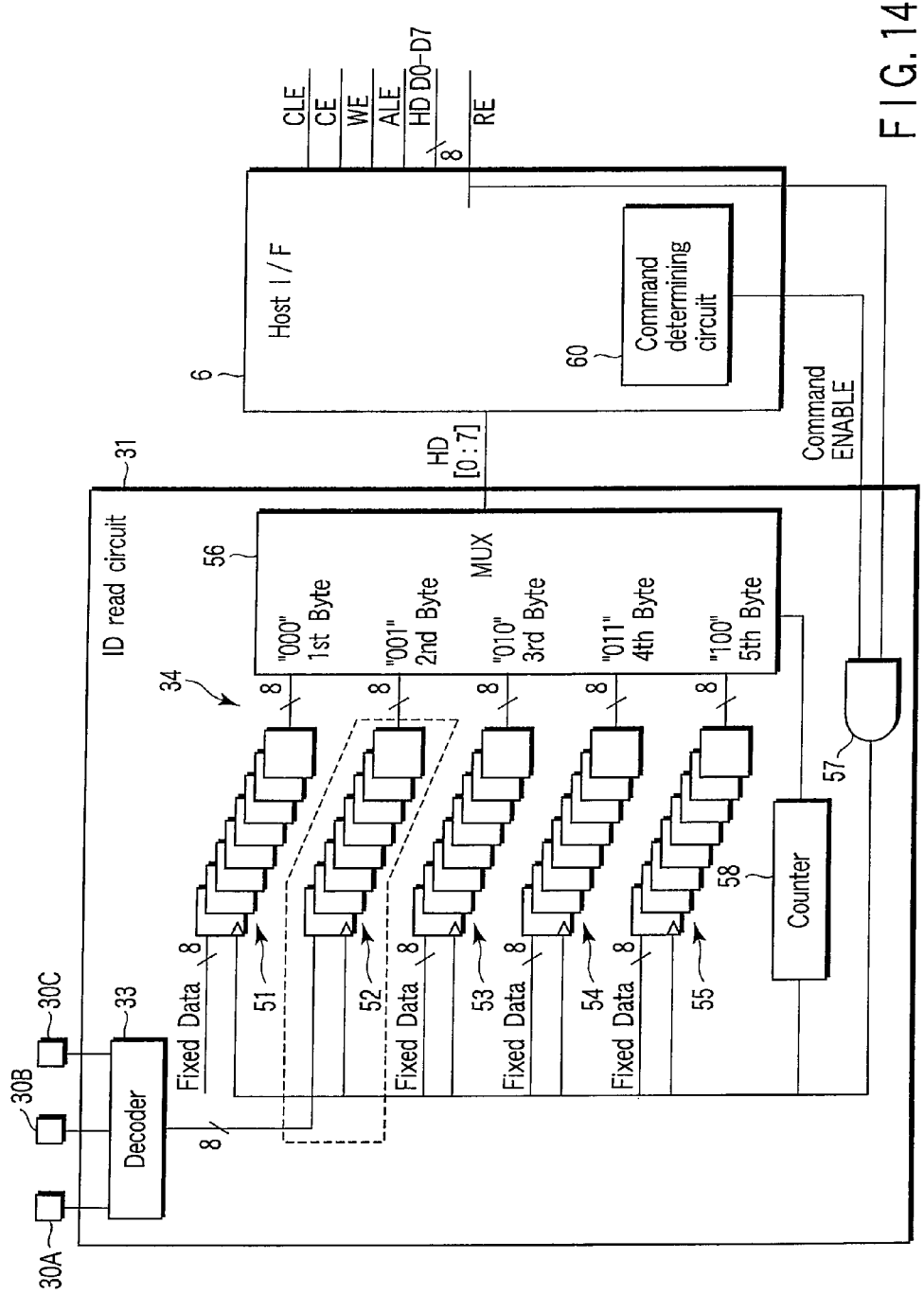
FIG. 14 is a block diagram showing, in detail, the configuration of a host interface and an ID lead circuit.

FIG. 14 is a block diagram showing, in detail, the configuration of the host interface 6 and the ID lead circuit 31.

The host interface 6 transmits and receives various signals (besides the R/B and D0 to D7, previously described, CLE, CE, WE, ALE, and RE) to and from the host 20 through the various pins.

The CLE (Command Latch Enable) signal is used to control the loading of commands into a command register contained in the host interface 6. The CE signal (low active) is used to choose the card. When this signal is at the high level, the memory card is in an operation mode. The WE signal (low active) is used for control performed to acquire a command, an address, or data through the I/O pins corresponding to the D0 to D7.

The ALE (Address Latch Enable) signal is used to control the loading of addresses into an address/data register contained in the host interface 6. The RE signal (low active) is used to control serial outputs of data.

The host interface 6 has a command determining circuit 60 that determines the type of a command sent by the host 20. If the command determining circuit 60 receives the ID read command, it outputs a command enable signal to the ID read circuit 31. Further, the command determining circuit 60 outputs the RE signal (low active), which causes data to be output to the host 20, to the ID read circuit 31. If a multiplexer 56 sends data to the host interface 6, the host interface 6 transmits the data to the host 20 through the D0 to D7 pins.

On the other hand, the ID read circuit 31 is provided not only with the decoder 33 and sequencer 34, previously described, but also with an AND circuit 57 and a counter 58. The sequencer 34 includes groups of flip-flops 51 to 55 and a multiplexer 56. Each group of flip-flops consists of eight flip-flops. An input end of the AND circuit 57 is supplied with the command enable signal and the RE signal. An output signal from the AND circuit 57 is supplied to a clock terminal of each flip-flop group 51 to 55. The output signal from the AND circuit 57 is also supplied to an input end of the counter 58.

The decoder 33 generates 8 bit data corresponding to the combination of the high and low levels of signals from the three terminals 30A, 30B, and 30C as previously described. The decoder 33 then sends the data to the sequencer 34.

The 8 bit data sent by the decoder 33 is input to one 52 of the flip-flop groups 51 to 55. The flip-flop group 52 outputs the 8 bit data in accordance with a signal supplied by the AND circuit 57. Eight bit data serving as a fixed value is input to the other flip-flop groups 51 and 53 to 55. The flip-flop groups 51 and 53 to 55 outputs the 8 bit data in accordance with a signal supplied by the AND circuit 57. Examples of the data serving as a fixed value include a code representative of a characteristic of the memory card and a code representative of the ID of the memory card. The 8 bit data output by the flip-flop groups 51 to 55 may be distinguishably called a "1st byte", a "2nd byte", a "3rd byte", a "4th byte", and a "5th byte".

The multiplexer 56 sequentially loads the 8 bit data output by the flip-flop groups 51 to 55 and outputs the data to the host interface 6.

The AND circuit 57 executes a logical AND process on the RE and command enable signals sent by the host interface 6. The AND circuit 57 then outputs the signal obtained. In response to the output signal from the AND circuit 57, the counter 58 executes a clocking process to control operation timings for the multiplexer 56.

Now, with reference to the timing chart in FIG. 15, description will be given of an operation performed by the host interface 6 in the controller 4 upon receiving the ID read command.

When the host interface 6 receives the ID read command or the like from the host 20, the CLE signal becomes high to load the ID read command into the command register. At this time, the CE signal becomes low. The low state is maintained until the memory card enters the standby state. Further, in accordance with the WE signal, the command and an address are acquired through the I/O pins corresponding to the D0 to D7. Moreover, in accordance with the ALE signal, the address is loaded into the internal address register. Finally, in accordance with the RE signal, data output by the ID read circuit 31 is serially output to the host 20 through the I/O ports corresponding to the D0 to D7 as Data 0, Data 1, Data 2, Data 3, . . . (for example, corresponding to the "1st byte", "2nd byte", "3rd byte", "4th byte", . . . , respectively).

Now, with reference to FIGS. 16 to 18, description will be given of a technique for suppressing the flow of a static current conducting from the power supply to the ground via the pull-up resistor 41 (or pull-down resistor), described in FIG. 12.

FIG. 16 is a diagram showing an example of a circuit that suppresses the flow of a static current conducting from the power supply to the ground via the pull-up resistor 41 in the configuration shown in FIG. 12. Here, description will be given of one terminal included in the terminal group 30, shown in FIG. 12. It is assumed that the terminal may be connected to the ground via wiring as shown in the figure or may be open (not shown).

The circuit shown in FIG. 16 is provided in the controller 4 and this circuit comprises a switchable pull-up I/O cell 61A having a switchable pull-up resistor 41A, a monitor/control circuit 62 that monitors the signal level of a signal line 70 through which a signal input from the terminal 30 is transmitted and which controls operations of the I/O cell 61A, and a counter circuit 63 that controls an operation period of the monitor/control circuit 62. The monitor/control circuit 62 and the counter circuit 63 may be provided, for example, in the ID read circuit 31.

The switchable pull-up I/O cell 61A includes a signal processor 71 in addition to the switchable pull-up resistor 41A. The pull-up resistor 41A is connected between the signal line 70, connected to the terminal 30, and the power supply VDD. The pull-up resistor 41A is configured to switchably enable and disable a pull-up operation of pulling up the signal level of the signal line 70. The signal processor 71 sends the pull-up resistor 41A a signal Zn corresponding to a control signal sent by the monitor/control circuit 62. The signal processor 71 thus switchably enables and disables the pull-up operation of the pull-up resistor 41A. Upon power-on, the pull-up operation is enabled.

The monitor/control circuit 62 includes a signal processor 72. Upon power-on or the like, the signal processor 72 starts a monitor/control operation in response to a reset signal Reset sent by the counter circuit 63. The signal processor 72 then sends the signal processor 71 a control signal for enabling the pull-up operation. Further, the signal processor 72 monitors the signal level of the signal line 70 for a specified period in accordance with a count signal sent by the counter circuit 63. If the signal level is high, the signal processor 72 maintains the control signal for enabling the pull-up operation. On the other hand, if the signal level is low, the signal processor 72 switches to a control signal for disabling the pull-up operation. In particular, if the terminal 30 is connected to the ground via wiring as shown in the figure, the signal level is low, so that the pull-up operation is switchably disabled. This prevents a static current from flowing from the power supply to the ground via the pull-up resistor. Further, after the specified time has elapsed, the signal processor 72 fixes the state of the control signal.

The counter circuit 63 includes a counter 73. Upon power-on or the like, the counter 73 sends a reset signal to the signal processor 72. The counter 73 also counts a specified time (at most 10 msec) for which the signal level of the signal line 70 is to be monitored. Information on the start and end of the monitor time is transmitted to the signal processor 72 through an OR circuit 74.

FIG. 17 is a diagram showing a variation of the circuit shown in FIG. 16. Here, differences from FIG. 16 will be described.

The circuit shown in FIG. 16 uses the switchable pull-up resistor 41A. In contrast, the circuit shown in FIG. 17 uses a switchable pull-down resistor 41B. In this example, description will also be given of one terminal included in the terminal group 30, shown in FIG. 12. It is assumed that the terminal may be connected to the power terminal via wiring as shown in FIG. 17 or may be open (not shown).

The pull-up resistor 41B is connected between the signal line 70, connected to the terminal 30, and the ground. The pull-up resistor 41B is configured to switchably enable and disable a pull-down operation of pulling down the signal level of the signal line 70. The signal processor 71 sends the pull-down resistor 41B the signal Zn corresponding to a control signal sent by the monitor/control circuit 62. The signal processor 71 thus switchably enables and disables the pull-down operation of the pull-down resistor 41B. Upon power-on, the pull-down operation is enabled.

In operation, if the signal level of the signal line 70 is low, the signal processor 72 in the monitor/control circuit 62 maintains the control signal for enabling the pull-down operation. On the other hand, if the signal level is high, the signal processor 72 switches to a control signal for disabling the pull-down operation. In particular, if the terminal 30 is connected to the power terminal via wiring as shown in the figure, the signal level is high, so that the pull-down operation is switchably disabled. This prevents a static current from flowing from the power supply to the ground via the pull-down resistor.

The configuration of the counter circuit 63 is similar to that shown in FIG. 16. Accordingly, its description is omitted.

FIG. 18 is a timing chart showing operations of the circuit shown in FIG. 16. However, the timing chart in FIG. 1 shows the operations performed if the target terminal 30 is open.

For example, upon power-on, a reset signal input by the counter circuit 63 to the signal processor 72 in the monitor/control circuit 62 becomes active. At the same time, on the basis of a clock CLK signal, the counter 73 starts clocking the monitor time (at most 10 msec). A signal CP indicating the monitor time is input to the signal processor 72. At this time, a signal AEN input by the signal processor 72 to the signal processor 71 becomes active. A signal Zn allowing the pull-up resistor 41A to perform a pull-up operation also becomes active. This enables the pull-up operation to make the signal level 80 of the signal line 70 high.

From beginning to end of the monitor time, the monitor/control circuit 62 monitors the signal level 80 of the signal line 70. In this example, the terminal 30 is open, so that the signal level 80 of the signal line 70 remains high.

When the monitor time is over, a signal CP input to the signal processor 72 indicates the end of the monitor time. On this occasion, the status of the signal AEN, input by the signal processor 72 to the signal processor 71, is fixed. In this example, the active status of the signal AEN is fixed, so that the signal Zn is active, thus enabling the pull-up operation. Thus, a signal the signal level 80 of which is high is transmitted to the interior of the ID read circuit 31.

On the other hand, if the terminal 30 is not open but is connected to the ground via wiring, the monitor/control circuit 62 detects during the monitor time that the signal level 80 of the signal line 70 is low. In this case, the signal AEN switchably becomes inactive, so that the signal Zn switchably becomes inactive. The pull-up operation is then switchably disabled. This operation prevents a static current from flowing from the power supply to the ground through the pull-up resistor. When the monitor time is over, the inactive status of the signal AEN is fixed, so that the signal Zn is inactive, thus disabling the pull-up operation. Thus, a signal the signal level 80 of which is low is transmitted to the interior of the ID read circuit 31.

As described above, according to the present embodiment, for example, even immediately after a power supply and before the setup process relating to the oscillation of the clock required to operate the CPU as well as the setting of the PLL is completed, it is possible to respond to the reset command or ID read command from the host. Consequently, the host can be notified of the information indicating the capacity of the memory or the like, within the period defined in the specifications of the memory card.

Furthermore, in the above description of the embodiment, the erase block size of the flash memory 3 actually used is larger than that of the flash memory assumed by the host 20. However, of course, the erase block size of the flash memory 3 actually used may be the same as that of the flash memory assumed by the host 20.

Furthermore, the above embodiment has been described using the NAND flash memory as a nonvolatile memory. However, the nonvolatile memory is not limited to the NAND flash memory. Other types of memories are applicable.

Furthermore, the present invention is applicable to cards other than the memory card (for example, a communication card). The present invention is also applicable to memories that are not shaped like a card.

As described above in detail, the present invention makes it possible to notify an external apparatus of predetermined information before the standby state is entered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system applicable to a memory device having a controller which includes a plurality of connection portions and a circuit operable in accordance with an internal clock, the memory system including:
an interface unit configured to notify an external apparatus of information without using the circuit upon receiving a predetermined command from the external apparatus before the memory device enters a standby state,
wherein the information is determined depending on whether each of the plurality of connection portions is electrically connected to a power terminal or a ground terminal.

2. The memory system according to claim 1, wherein the predetermined command is a command input before oscillation of the internal clock is completed.

3. The memory system according to claim 1, wherein the information includes information indicating a storage capacity of a predetermined memory.

4. A memory system applicable to a memory device having a controller which includes a plurality of connection portions and a circuit operable in accordance with an internal clock, the memory system including:
an interface unit configured to notify an external apparatus of information without using the circuit upon receiving a predetermined command from the external apparatus before the memory device enters a standby state,
wherein the information is determined depending on whether or not each of the plurality of connection portions is electrically connected to one of a plurality of terminals.

5. The memory system according to claim 4, wherein the predetermined command is a command input before oscillation of the internal clock is completed.

6. The memory system according to claim 4, wherein the information includes information indicating a storage capacity of a predetermined memory.

7. The memory system according to claim 4, wherein the plurality of terminals are ground terminals, and
the device further includes:
pull-up resistors each of which is connected between a respective one of the plurality of connection portions and a power supply and which is capable of switchably enabling and disabling a pull-up operation of pulling up a signal level obtained from the respective one of the plurality of connection portions; and
a control unit configured to switchably control a pull-up resistor to enable or disable the pull-up operation depending on whether the signal level is high or low.

8. The memory system according to claim 4, wherein the plurality of terminals are power terminals, and
the device further includes:
pull-up resistors each of which is connected between a respective one of the plurality of connection portions and a ground and which is capable of switchably enabling and disabling a pull-down operation of pulling down a signal level obtained from the respective one of the plurality of connection portions; and
a control unit configured to switchably control a pull-down resistor to enable or disable the pull-down operation depending on whether the signal level is low or high.

* * * * *